(12) United States Patent
Hou et al.

(10) Patent No.: US 7,267,736 B2
(45) Date of Patent: Sep. 11, 2007

(54) METHOD OF JOINING DISSIMILAR MATERIALS

(75) Inventors: Wenkao Hou, Ypsilanti, MI (US); Shixin Jack Hu, Ann Arbor, MI (US); Pei-Chung Wang, Troy, MI (US)

(73) Assignees: General Motors Corporation, Detroit, MI (US); University of Michigan, Ann Arbor, MI (US)

( * ) Notice: Subject to any disclaimer, the term of this patent is extended or adjusted under 35 U.S.C. 154(b) by 283 days.

(21) Appl. No.: 10/739,356

(22) Filed: Dec. 18, 2003

(65) Prior Publication Data

US 2005/0133483 A1 Jun. 23, 2005

(51) Int. Cl.
- B29C 65/00 (2006.01)
- B32B 37/00 (2006.01)
- B32B 7/04 (2006.01)
- B21J 15/00 (2006.01)

(52) U.S. Cl. .................. 156/91; 156/272.2; 29/525.06; 29/525.07

(58) Field of Classification Search ............. 156/272.2, 156/273.3, 273.9; 219/118
See application file for complete search history.

(56) References Cited

U.S. PATENT DOCUMENTS

| | | | |
|---|---|---|---|
| 3,524,042 A | 8/1970 | Bennett | 219/150 |
| 4,766,283 A * | 8/1988 | McCorvey et al. | 219/98 |
| 5,739,498 A * | 4/1998 | Sunamoto et al. | 219/78.15 |
| 6,362,448 B1 | 3/2002 | Roser | 219/99 |
| 6,694,597 B2 * | 2/2004 | Wang et al. | 29/525.06 |
| 6,769,595 B2 * | 8/2004 | Stol et al. | 228/112.1 |
| 6,836,948 B2 * | 1/2005 | Wang | 29/432.1 |
| 6,913,666 B1 * | 7/2005 | Aeschlimann et al. | 156/73.1 |
| 2001/0027597 A1 * | 10/2001 | Mauer et al. | 29/407.04 |
| 2004/0050906 A1 * | 3/2004 | Rice et al. | 228/112.1 |
| 2004/0197134 A1 * | 10/2004 | Wang et al. | 403/234 |

FOREIGN PATENT DOCUMENTS

WO WO9842988 A1 * 10/1998

\* cited by examiner

*Primary Examiner*—Justin R. Fischer

(57) ABSTRACT

The present invention provides a method of joining dissimilar materials, particularly a non-ferrous component to a ferrous component to form an assembly. In an overlapping configuration, the parts are held together under a clamping force while a self-piercing rivet is driven through the assembly by a welding electrode. The rivet pierces and passes through the non-ferrous component and then at least into contact with the ferrous component to thereby form a mechanical interlock. An electrical current is then applied to this mechanical retention to melt a portion of the rivet as well as a portion of the ferrous metal in the joining region. The flow of electrical current is then stopped after several welding cycles where the now melted material is allowed to solidify upon cooling, thereby forming a weld.

10 Claims, 1 Drawing Sheet

METHOD OF JOINING DISSIMILAR MATERIALS

TECHNICAL FIELD

This invention relates to a method of joining dissimilar materials. More specifically, the invention relates to a joining method in which a first material is attached to a second material using a penetrating welding member therebetween, wherein a welding current is momentarily passed through the welding member to fuse the welding member to the second material and thereby trap the first material therebetween.

BACKGROUND OF THE INVENTION

Shaped metal tubes are desirable for use in automotive body assemblies due to their strength and relatively low weight. In constructing automotive body assemblies that use bent, hydroformed tubes or the like, it is sometimes necessary to join a body member to a structural tube, wherein the body member is composed of a first material and the structural tube is composed of a dissimilar, second material.

However, it is often difficult to use traditional spot welding, riveting, or bolting practices to make sheet-to-tube assemblies. It has been difficult, if not impossible, to reliably spot weld dissimilar materials such as ferrous to non-ferrous materials, particularly steel to aluminum. Such materials have significantly different melting points, which tend to render the materials incompatible for traditional resistance welding techniques, wherein the first material is attempted to be welded directly to the second material.

Moreover, riveting and bolting such dissimilar materials tends to be undesirable for several reasons. First, the tensile strength of a rivet joint or a bolt joint is relatively low compared to a weld joint. Second, extensive and tedious experiments must be conducted to determine the optimal die and rivet for a particular selection of material composition and thickness. Third, many riveting and bolting operations are prohibitively complex. For example, riveting operations require not only a punch to drive a head on the rivet, but also require a backup die to deform a shank of the rivet, wherein the backup die can be extremely difficult position deep within a tubular part. Also, bolting operations tend to involve messy milling and tapping operations and/or difficult bolt and nut assembly operations.

Thus, it is an object of the present invention to provide a method of joining dissimilar materials for an automotive body assembly or the like. It is a further object of the present invention to provide a method of joining dissimilar materials where the joint is robust and will contribute to the structural integrity of the assembly.

SUMMARY OF THE INVENTION

This invention is applicable to joining dissimilar materials, such as first and second components composed respectively of non-ferrous and ferrous materials. More particularly, this invention is applicable to joining aluminum, magnesium, composite, and plastic components to steel components, such as a body panel to an alloy steel tube for an automobile body assembly. A suitable fixture may be provided to hold an attachment surface of the first component against the second component, especially when the joining operation is to be repeated like, for example, in a vehicle body manufacturing line.

The joining operation generally comprises driving a welding member through at least a portion of the first component or material and into contact with at least a portion of the second component or material, and then passing an electrical current through the welding member and the second material to fuse the welding member to the second material. Preferably, the welding member is harder than the first and second component materials and similar in composition to the second component material to facilitate a good weld. The joining operation may also comprise providing the welding member with an enlarged portion so as to trap the first material between the enlarged portion and the second material.

More specifically the joining operation includes staking the first component to the second component with a self-piercing rivet or the like. A shank of the rivet or other staking connector is driven through the first component into the wall of the second component. Preferably, the shank of the rivet is a hollow cylinder with a tapered, sharpened end for penetrating the thickness of the first component and the wall of the second component. A head of the rivet is driven against the outer surface of the first component and the shank of the rivet penetrates well into the wall of the second component, or even through it. But since the second component may be an elongated hollow body, there may be no access to the buried end of the rivet shank to form it over against the inside of the wall of the second component to secure a riveted joint. In accordance with the invention, the rivet is permanently secured in the first component and second component by passing an electrical current through the rivet and second component to fuse the rivet to at least the surrounding second component material.

The fusing step is carried out by applying one electrode against the head of the rivet and an opposing electrode against an opposite wall of the tube. A suitable high amperage electrical current, which is like a welding current, is passed between the electrodes. This current is suitably a 60 Hz alternating current or a rectified 60 Hz alternating current and the electrodes are best made of copper or a copper alloy. The welding current passes between the electrodes and through the second component, or around the local circumference of the second component, and through the rivet and adjoining material of the first component. The presence of small gaps between the rivet and the surrounding first and second components provide relatively high electrical resistance to the current. The metal at the respective gaps is rapidly heated and fused. After several cycles of the 60 Hz current, the electrical current is stopped. A nugget of fused material between the rivet and second component secures the staked, mechanical joint. Of course, more than one such joint may be required to securely join a given first component to a second component.

In a preferred embodiment of the invention, the electrode for contact with the rivet head is used like a hammer to drive the rivet through the first component into the wall of the second component, and the counter-electrode on the opposite side of the second component is used like an anvil to hold the second component against the impact of the self-piercing rivet. The counter-electrode is shaped, if necessary, to conform to a contour in the second component so as to better serve both the anvil function and electrical contact function of that electrode.

An advantage of the subject joining process is that much of the joining effort is applied from the outside of the first component and only the anvil/counter electrode need be brought into contact with the opposite side of the second component. Many of the components to be joined in automotive body construction are of complex shape and full two-sided access to the surfaces of the parts at the joining location may be difficult.

These and other objects and advantages of this invention will become apparent from a detailed description of the preferred embodiment that follows.

DESCRIPTION OF THE PREFERRED EMBODIMENT

The present invention generally provides a method of joining dissimilar materials, such as a non-ferrous component to a ferrous component. More specifically, the present invention provides a method of joining a non-ferrous sheet-metal component to a ferrous metal tube, such as for use in automotive body assemblies. The present invention also contemplates the reverse scenario wherein a method is provided for joining a ferrous sheet metal component to a non-ferrous metal tube. The method of this invention uses features of self-piercing riveting practices and resistance spot welding methods to provide an improved method for joining dissimilar materials, which is particularly well suited to welding a sheet metal component to a tube with only single-sided access to the joining location. The present invention, however, also contemplates that the ferrous and non-ferrous components may be attached using only a weld joint, rather than the combination of a weld joint and mechanical fastening joint. The practice of the invention will be illustrated using a flat portion of a sheet metal part and a square tube but the subject process is applicable to round tubes and the like. Sheet metal parts of complex shape with a flattened portion for joining to the tube are applicable as well.

Figure 2:
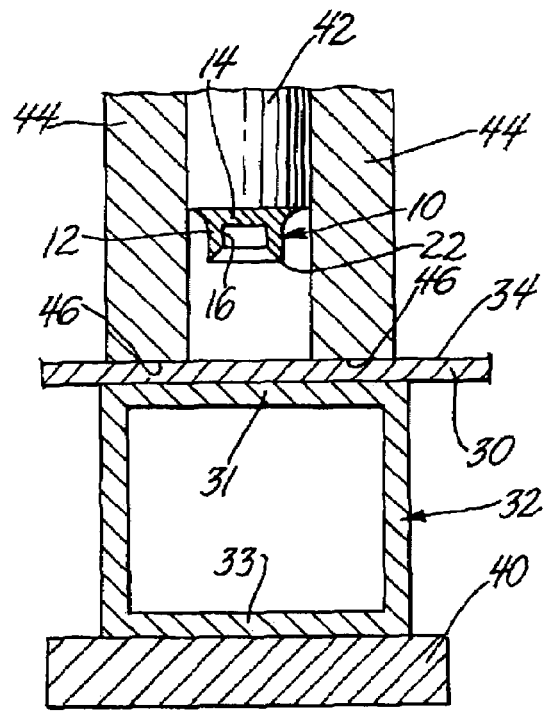
FIG. 2 is a side view, partially in cross-section, showing the clamping stage of the present invention where the first and second components are secured for joining.
Figure 3:
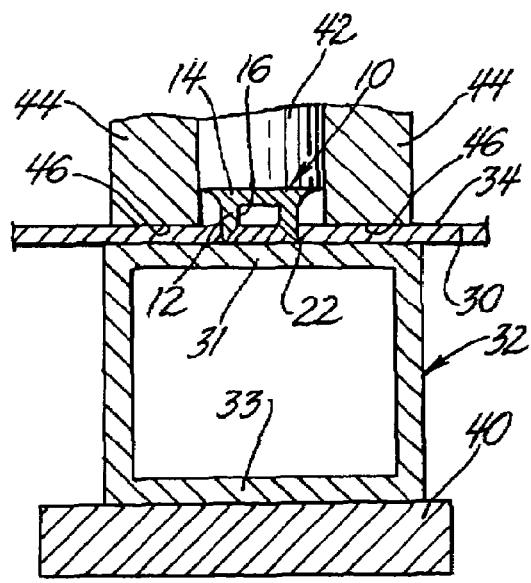
FIG. 3 is a side view, partially in cross-section, showing the self piercing rivet being driven through the first component into the second component in accordance with the present invention.
Figure 4:
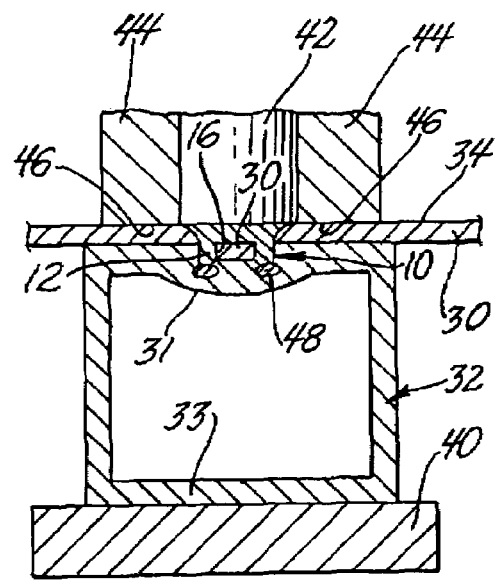
FIG. 4 is a side view, partially in cross section, showing the completed riveting process and the application of electrical current to weld and secure the riveted joint.

The present invention is sequentially shown in FIGS. 2-4. The tooling shown in these Figures, however, is not necessarily drawn to scale. The Figures represent idealized views of the joining process for purposes of illustration. But, the actual components shown in these Figures and the geometrical relationships therebetween, may vary widely depending upon the specific selection of material thicknesses, material compositions, and welding parameters.

Starting with FIG. 2, a joint is to be made between a flat portion of a first component 30 and an upper side wall 31 of a second component 32, wherein the first and second components are composed of dissimilar materials. For example, the first component 30 may be constructed of sheet metal and composed of a non-ferrous material such as aluminum or magnesium. Moreover, the non-ferrous material need not be metallic, but may instead be composed of a composite or polymeric material. The second component 32 may be constructed of square tube-stock and composed of a ferrous material such as galvanized steel. Alternatively, the present invention contemplates the opposite configuration, wherein a ferrous rivet pierces through a non-ferrous structural tube and welds to a ferrous sheet metal body component.

The flat portion of the first component 30 is placed against a wall surface of the second component 32 at a predetermined joining location. These parts are then held together, under a clamping force, to maintain positioning of the parts during the joining operation. In this process a riveting step and a fusion step are used. Accordingly, tools used in the riveting and welding may be used in the clamping. Thus, in FIG. 2, for example, a round, hollow cylinder 44 is used to apply the clamping force. The flat end 46 of cylinder 44 presses against the upper flat surface 34 of first component 30. As will be seen, cylinder 44 will be used in the riveting step of the process. A clamping force is also applied to the opposite side wall 33 of second component 32. In this case, the clamping force is applied by a copper slab, or back-up, which serves as a counter-electrode 40 in a subsequent welding step.

Figure 1:
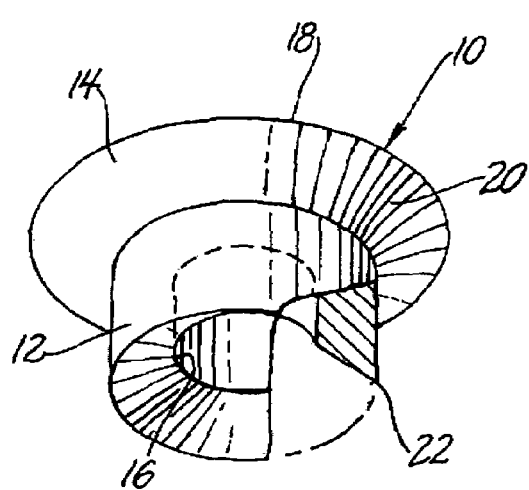
FIG. 1 is a tilted, side view, partly in cross-section of a self-piercing rivet having a hollow tapered piercing shank adapted to penetrate a first component and the wall of a second component.

While subjected to the clamping force, the second component 32 is initially mechanically joined to the first component 30 by means of self-piercing riveting. Any suitable self-piercing fastener composed of any material that is compatible with one or more of the components 30 and 32 will be suitable in practicing the present invention. Preferably, however, a ferrous-based composition is preferred. For purposes of illustration, a self-piercing rivet in describing this invention is shown in FIG. 1. A fastener, or any type of welding member, such as a self-piercing rivet 10 comprises a round hollow shank 12 and a flat rivet head 14. Other fasteners or similar components may be used, other than self-piercing rivets. For example, studs, lugs, bolts, and the like could be substituted for the self-piercing rivet 10. Axially extending through shank 12 is a central hole 16, which defines the inner surface of shank 12. Shank 12 terminates in a tapered sharpened edge 22 for piercing the first component 30 and wall 31 of second component 32. Piercing edge 22 is suitably hardened to penetrate metal.

At the opposite end of hollow shank 12 is flat rivet head 14 that provides an impact surface for driving rivet 10 into the first component 30. Specifically, rivet head 14 is a flat-headed, annular flange where its top surface 18 comprises a diameter that is significantly larger than shank 12. Below top surface 18, head 14 circumferentially tapers into shank 12. Tapered surface 20 permits rivet 10 to be driven into the first component 30 until top surface 18 lies smoothly against part surface 34 (as shown in FIG. 4).

The first step of this joining method comprises driving self-piercing rivet 10 through first component 30 and through at least a substantial portion of wall 31 of second component 32 to temporarily stake the parts together. This rivet driving step can be accomplished by any suitable means. However, since the rivet piercing step is to be followed by a welding step, it may be preferred to combine tooling for the two steps. For example, welding electrode 42, shown in a broken away illustration in FIGS. 2-4, may be used to hammer or drive rivet 10 through the metal layers.

For the riveting step, cylinder 44 is sized to accommodate the round head 14 of rivet 10. Welding electrode 42, with a flat tip for hammering, is sized to the diameter of rivet head 14 and can slide axially up and down in cylinder 44. Cylinder 44 helps to locate rivet 10 on the joining portion of first component 30 and to keep it aligned as it is being driven into surface 34. It also provides suitable clamping force on the assembled parts for the joining operation. Also, copper slab 40 is shaped to fit closely against wall 33 to hold second component 32 against first component 30 and for good electrical contact with wall 33. Copper slab 40 acts as an electrode, a counter electrode for welding electrode 42.

As shown in FIG. 3, rivet 10 is then driven into the first component 30 using electrode 42 as a rivet punch. Upon sudden and forceful impact of electrode 42 against rivet head 14, piercing edge 22 will engage and penetrate top surface 34 of first component 30. Thus, rivet 10 forms its own aperture. As shown in FIG. 4, rivet 10 is pushed through first component 30 and into second component 32 until rivet head 14 is flush with top surface 34 of first component 30. Accordingly, the first component 30 is sandwiched between the rivet head 14 and the second component 32. Rivet 10 is driven into first component 30 under a high rate and impact so that it will penetrate the sheet without significantly deforming it. The first component 30 and second component 32 may deform inwardly from the impact of the rivet 10 as seen in FIG. 4. FIG. 4 illustrates the situation in which the inserted rivet 10 has pierced the first component 30 without bending it and has bent the metal second component 32 inwardly. The rivet 10 has pierced through the first component 30 and pushed in the tube wall 31. As seen, second component 32 protrudes slightly below hollow center 16 of shank 12 of the rivet 10. Sheet or tube material captured in hollow center 16 of rivet 10 may contribute to the weld layer as welding material. Thus, a mechanical attachment is formed between first component 30 and second component 32.

The riveted, mechanical attachment is secured using a resistance spot welding process. In this welding process, rivet 10 receives a pulse of high current flow from welding electrode 42 and copper slab 40, which acts as a counter electrode. The current flow may be applied anytime before or after the above-described riveting operation is completed, or even started. This pre-application of current flow tends to soften the workpiece components, thereby facilitating the puncture of the rivet 10 therethrough. Preferably, however, the current flow is applied just prior to contact between the rivet 10 and the second component 32. A steady application of force is supplied by cylinder 44 and copper slab 40, and a pulse of high amperage AC (or rectified AC) current is directed through the facing electrodes 40, 42 to the joining location. Typically a 60 Hertz welding current is applied for several cycles of electrical current application, which amounts to less than a second of applied electrical current. Resistance to the electrical current by rivet 10 and second component 32 generates heat in the flow path of the current, thereby causing the metal located at the joining location to melt as well as a substantial portion of shank 12 of rivet 10.

The material for rivet 10 should be selected depending upon the material selections for the first and second components 30 and 32, such that the rivet 10 has a similar resistance to electrical current as the second component 32 material. Preferably, the rivet 10 is composed of alloy steel, similar to that of the second component 32. As such, that rivet 10 will contribute to welding material for the weld joint between the rivet 10 and the second component 32, such that the rivet 10 will weld with the surrounding metal of the second component 32. Upon cooling, the molten metal solidifies to form weld nugget 48. The weld nugget 48 is shown formed deep within the wall 31 of the second component 32. Alternatively, however, the individual components and the weld joint itself could be designed such that the weld nugget 48 is formed closer to the top surface of the wall 31, such as at the interface of the first and second components 30, 32. Moreover, the rivet 10 should be relatively harder than the first and second components 30 and 32. Specifically, it is preferred that the rivet 10 should be on the order of at least about 50 Vickers scale harder.

When the material selection involves a non-ferrous first component and a ferrous rivet, appropriate coatings may be applied to the rivet 10 to improve the bond strength between the rivet 10 and the first component 30. In other words, to improve the metallurgical compatibility between the rivet material and first component material, the rivet 10 may include any one of several coatings or treatments, such as galvanization.

Testing reveals that the weld joint of the present invention is roughly 145% as strong as a rivet joint of the same configuration without the welding steps. The test setup involved a standard pedestal resistance spot/projection welding machine manufactured by Continental Avia Engineering Co. of Detroit, Mich., using a power rating of 75 KVA and a MEDAR 3000S controller, model no. 3015. The standard welding shank was modified to provide increased stiffness and strength. For example, the welding shank was modified to be 1.2 inches in diameter and 1.6 inches long. The welding shank also included a 0.56 inch deep tapered pocket that cooperates with the tapered-shank of a self-piercing rivet.

The test involved comparing tensile strengths between a standard rivet joint and a rivet spot weld joint according to the present invention, between a 1 mm thick aluminum sheet and a 1 mm thick galvanized steel sheet. The tensile strength of the simple rivet joint revealed a peak tensile load of 1.61 kN, whereas the tensile strength of the rivet spot weld joint revealed a peak tensile load of 2.33 kN. Accordingly, the present invention provides a method of achieving a much more robust joint between dissimilar materials.

The method of the present invention allows a secure and strong mechanical bond and weld to be formed between dissimilar materials, particularly a sheet metal part and a tubular part, where the tubular part may be bent and/or hydroformed. Such tubular parts are difficult to join with other metallic parts because tooling cannot reach the inside of the tube, but the method of the present invention overcomes this difficulty. In a preferred embodiment, the electrode tooling is used to clamp the pieces together, drive the rivet into the parts and weld the rivet to the parts. Such consolidation of the duties of specific pieces of equipment allows the joining process to be economically and efficiently advantageous in vehicle fabrication, and specifically in automotive body assembly processes.

While the invention has been described in terms of a preferred embodiment, it is not intended to be limited to that description, but rather only to the extent of the following claims.

The invention claimed is:

1. A method of joining dissimilar materials, said method comprising the steps of:
   placing a first component against a second component at a predetermined joining location, wherein the first and second components are composed of dissimilar materials;
   driving a self-piercing rivet through said first component and into said second component to mechanically attach said first component to said second component at said joining location, the self-piercing rivet comprising a head attached to a hollow cylindrical shank with a tapered end so that the shank penetrates through said first component and into said second component and encloses material of said first component in the hollow of said shank;

passing an electrical current through said self-piercing rivet and said second component at said joining location to fuse material at an interface of at least the shank of said rivet and said second component; and stopping the flow of electrical current to solidify the fused material and form a welded bond between at least said rivet and said second component.

2. The method as recited in claim 1 comprising passing said electrical current by contacting said rivet with a first electrode and contacting said second component with a second electrode at a second surface opposite said joining location and using said electrodes to pass said current through said rivet and second component.

3. The method as recited in claim 1 comprising engaging said first component at said joining location with an electrode assembly comprising a first electrode and a hollow cylindrical electrode tool, said tool being adapted to encompass said rivet and said first electrode and to exert a clamping force on said first component;

engaging said second component at a second surface with a second electrode adapted to conform to said second surface for clamping and electrical contact; and using said electrodes to pass said current through said rivet and second component, said current flowing around or through said second component from said second surface to said joining location and said interface.

4. The method as recited in claim 1 comprising engaging said first component at said joining location with an electrode assembly comprising a first electrode and a hollow cylindrical electrode tool, said tool being adapted to encompass said rivet and said first electrode and to exert a clamping force on said first component;

engaging said second component at a second surface with a second electrode adapted to conform to said second surface for clamping and electrical contact;

placing said rivet in said electrode tool and driving said rivet through said first component and into said second component with said first electrode; and using said electrodes to pass said current through said rivet and said second component.

5. A method of joining a non-ferrous component to a ferrous component, said method comprising the steps of:

pressing said non-ferrous component against one surface of said ferrous component at a predetermined joining location using a first electrode assembly to press against said non-ferrous component and a second electrode against another surface of said ferrous component;

driving a self-piercing ferrous rivet through said non-ferrous component using said first electrode and at least into contact with a wall of said ferrous component at said joining location to mechanically attach said non-ferrous component to said ferrous component, the self-piercing ferrous rivet comprising a head attached to a hollow cylindrical shank with a tapered end so that the shank penetrates through said first component and into said second component and encloses material of said first component in the hollow of said shank; and passing an electrical current through said electrodes, said ferrous rivet, and said ferrous component at said joining location to fuse at least said ferrous rivet to said ferrous component; and stopping the flow of electrical current to form a welded bond between at least said rivet and said ferrous component.

6. A method of joining a non-ferrous component to a ferrous component as recited in claim 5 in which the non-ferrous component comprises a metal alloy.

7. A method of joining a non-ferrous component to a ferrous component as recited in claim 5 in which the non-ferrous component comprises a polymer composition.

8. A method of joining a sheet portion of a non-ferrous component to a ferrous tube having a first surface and a second surface opposing the first surface, said method comprising the steps of:

pressing the sheet portion of the non-ferrous component against the first surface of the ferrous tube at a predetermined joining location using a first electrode assembly to press against said non-ferrous component and a second electrode against the second surface of the ferrous tube;

driving a self-piercing ferrous rivet through the sheet portion of the non-ferrous component and at least into contact with the first surface of the ferrous tube at said joining location to mechanically attach said non-ferrous component to said ferrous tube, the self-piercing ferrous rivet comprising a head attached to a hollow cylindrical shank with a tapered end so that the shank penetrates through the sheet portion of the non-ferrous first component and into the ferrous tube and encloses material of the first component in the hollow of the shank; and passing an electrical current through the electrodes, the ferrous rivet, and the ferrous component at said joining location to fuse at least the ferrous rivet to the ferrous component; and stopping the flow of electrical current to form a welded bond between at least the rivet and the ferrous component.

9. A method of joining a non-ferrous component to a ferrous tube as recited in claim 8 in which the non-ferrous component comprises a metal alloy.

10. A method of joining a non-ferrous component to a ferrous tube as recited in claim 8 in which the non-ferrous component comprises a polymer composition.

\* \* \* \* \*